(12) United States Patent
Thayer

(10) Patent No.: US 9,298,668 B2
(45) Date of Patent: Mar. 29, 2016

(54) BIT ERROR RATE REDUCTION BUFFER, METHOD AND APPARATUS

(75) Inventor: Larry J. Thayer, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1304 days.

(21) Appl. No.: 12/831,082

(22) Filed: Jul. 6, 2010

(65) Prior Publication Data

US 2010/0275098 A1 Oct. 28, 2010

Related U.S. Application Data

(62) Division of application No. 11/445,589, filed on Jun. 2, 2006, now Pat. No. 7,783,935.

(51) Int. Cl.
| | |
|---|---|
| *G06F 13/42* | (2006.01) |
| *G06F 11/10* | (2006.01) |
| *H04L 25/14* | (2006.01) |
| *G06F 13/16* | (2006.01) |
| *H04L 1/24* | (2006.01) |
| *H04B 10/40* | (2013.01) |
| *H04L 1/00* | (2006.01) |

(52) U.S. Cl.
CPC ........ *G06F 13/4295* (2013.01); *G06F 13/1673* (2013.01); *G06F 13/1684* (2013.01); *H04B 10/40* (2013.01); *H04L 1/0001* (2013.01); *H04L 1/242* (2013.01); *H04L 25/14* (2013.01); *G06F 11/1004* (2013.01); *Y02B 60/1228* (2013.01); *Y02B 60/1235* (2013.01)

(58) Field of Classification Search
CPC ............ G06F 13/4295; G06F 11/1004; G06F 13/1673; G06F 13/1684; Y02B 60/1235; Y02B 60/1228; H04L 25/14; H04L 1/242; H04L 1/0001; H04B 10/40

USPC ................. 714/700, 704, 705, 712, 717, 718; 370/333; 398/27; 713/503
See application file for complete search history.

(56) References Cited

U.S. PATENT DOCUMENTS

| | | | |
|---|---|---|---|
| 4,597,058 | A | 6/1986 | Izumi et al. |
| 6,502,161 | B1 | 12/2002 | Perego et al. |

(Continued)

OTHER PUBLICATIONS

United States Patent and Trademark Office, "Notice of Allowance and Fees Due" issued in connection with U.S. Appl. No. 11/445,589, mailed Apr. 19, 2010 (8 pages).

(Continued)

*Primary Examiner* — John J Tabone, Jr.
(74) *Attorney, Agent, or Firm* — Klass, Law, O'Meara & Malkin, P.C.

(57) ABSTRACT

A disclosed example bit error rate reduction buffer comprises a data recovery circuit including differential bit pair inputs and differential bit pair outputs, a CRC circuit including differential bit pair inputs, differential bit pair outputs and a fault-isolation indicator, and a serializer including differential bit pair inputs and differential bit pair outputs. The differential bit pair outputs of the data recovery circuit being coupled to the differential bit pair inputs of the CRC circuit, the differential bit pair outputs of the CRC circuit being coupled to the differential bit pair inputs of the serializer, the differential bit pair inputs of the data recovery circuit to be driven by a first HSS link, the different bit pair outputs of the serializer to drive a second HSS link; and the fault-isolation indicator of the CRC circuit to indicate a fault when a fault is detected by the CRC circuit.

5 Claims, 5 Drawing Sheets

(56) References Cited

U.S. PATENT DOCUMENTS

| | | |
|---|---|---|
| 7,093,061 B2 | 8/2006 | Teo |
| 7,168,027 B2 | 1/2007 | Lee et al. |
| 7,327,612 B2 | 2/2008 | Bacchus et al. |
| 7,356,756 B1 | 4/2008 | Chan et al. |
| 7,454,537 B1 | 11/2008 | Xue |
| 7,535,844 B1 * | 5/2009 | Gulstone ............ 370/236 |
| 7,587,012 B2 | 9/2009 | Evans et al. |
| 2004/0236877 A1 | 11/2004 | Burton |
| 2007/0300104 A1 | 12/2007 | Thayer |
| 2008/0301533 A1 | 12/2008 | Lee et al. |
| 2009/0013108 A1 | 1/2009 | Rajamani |

OTHER PUBLICATIONS

United States Patent and Trademark Office, "Non-final Office Action" issued in connection with U.S. Appl. No. 11/445,589, mailed Jan. 15, 2010 (20 pages).

United States Patent and Trademark Office, "Restriction Requirement" issued in connection with U.S. Appl. No. 11/445,589, mailed Sep. 22, 2009 (6 pages).

Tektronix, "Preparing for FB-DIMM and DDR2, Are you Ready?", May 25, 2005, Tektronix, Inc. (7 pages).

Gursoy et al., "Design and Realization of a 2.4Gbps-3.2Gbps Clock and Data Recovery Circuit", Proceedings of the IEEE International Systems-on-Chip (SOC) Conference, 2003 (4 pages).

* cited by examiner

BIT ERROR RATE REDUCTION BUFFER, METHOD AND APPARATUS

RELATED APPLICATION

This patent arises from a divisional of U.S. application Ser. No. 11/445,589, (now U.S. Pat. No. 7,783,935), entitled "Bit Error Rate Reduction Buffer," which was filed on Jun. 2, 2006 and is hereby incorporated herein by reference in its entirety.

BACKGROUND

High speed serial (HSS) links have, in many cases, replaced shared parallel buses in such areas as storage devices, multimedia PCs, entertainment systems, and telecom systems. As a result, standard interfaces such as XAUI (Xilinx Attachment Unit Interface), Serial ATA (Advanced Technology Attachment), PCI (Peripheral Component Interconnect) Express, HDMI (High Definition Multimedia Interface), and FB-DIMM (Fully Buffered Dual In-Line Memory Module) have emerged to provide improved throughput using serial signaling rates in the GHz range.

HSS links provide distinct system implementation advantages. When compared to traditional parallel interfaces, HSS links can provide lower cost by using fewer I/O pins and simplified routing. Printed circuit board (PCB) area used for connecting signals can be reduced substantially because of the utilization of fewer layers, fewer components, and the reduction of on-board termination elements. Because differential signals are commonly used with HSS links, noise tolerance is improved, better voltage margins are achieved, and electromagnetic interference (EMI) radiation is reduced. HSS links can also reduce data skew among multiple parallel lines. In addition, since the clock may be embedded in the serial data stream, issues of timing and clock skew may be reduced as well.

While the advantages of HSS links have driven the standardization and fast adoption of HSS links, HSS links present many challenges to designers. Reliable signal transmission across a motherboard or between daughter cards may be difficult to achieve at GHz speeds. As data rates approach 3 Gbit/s and higher, the number of variables for which a board designer must account is enormously complex. A quantitative understanding of such variables as dielectric constant, return loss, inter-symbol interference (ISI) jitter, and dynamic variances such as temperature and humidity change is necessary to achieve GHz speeds.

HSS links often have a maximum limit for BER (bit error rate). BER is the percentage of bits with errors divided by the total number of bits that have been transmitted, received or processed over a given time period. JEDEC (Joint Electronic Devices Engineering Council, part of the Electronic Industries Association that publishes specifications and standards for electronic components) specifies in its FBD (Fully Buffered DIMM) specification, for example, a maximum BER of 10-12 bits/sec when driving from a memory controller to a DIMM (dual in-line memory module). When a HSS link becomes physically too long, the BER on that link may increase beyond the required specification. In this type of situation, it becomes necessary to reduce the BER without sacrificing frequency requirements or changing the electrical characteristics of the board.

There is a need in the art for an electronic device that improves BER on HSS links that would otherwise fail to meet a required specification.

DETAILED DESCRIPTION

Figure 1:
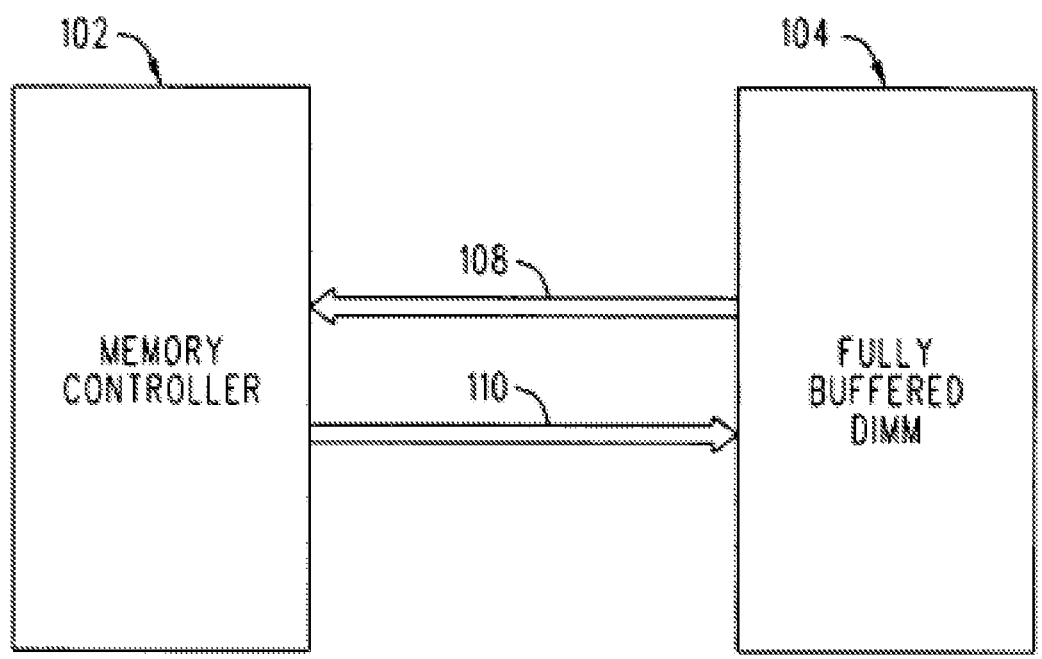
FIG. 1 is a block diagram of a memory controller, high speed serial links, and a fully buffered dual in-line memory module (FB DIMM). (Prior art)

FIG. 1 is a block diagram of a memory controller 102, high speed serial (HSS) links 108, and 110, and a fully buffered dual in-line memory module (FBDIMM) 104. Data may be driven from a memory controller 102, to a FBDIMM 104, via HSS link 110. Each HSS link 108 and 110 contains a plurality of lanes where an individual lane comprises a differential bit pair. Data may also be driven from the FBDIMM 104, to the memory controller 102, via HSS link 108. Today, because signals may be switched at frequencies in the GHz range, the dispersive nature of a PC board and the physical length of the HSS links reduce signal strength such that noise induces errors. Bit errors may be reduced by improving the electrical characteristics of the PC board or by shortening the physical length of the HSS links.

Figure 2:
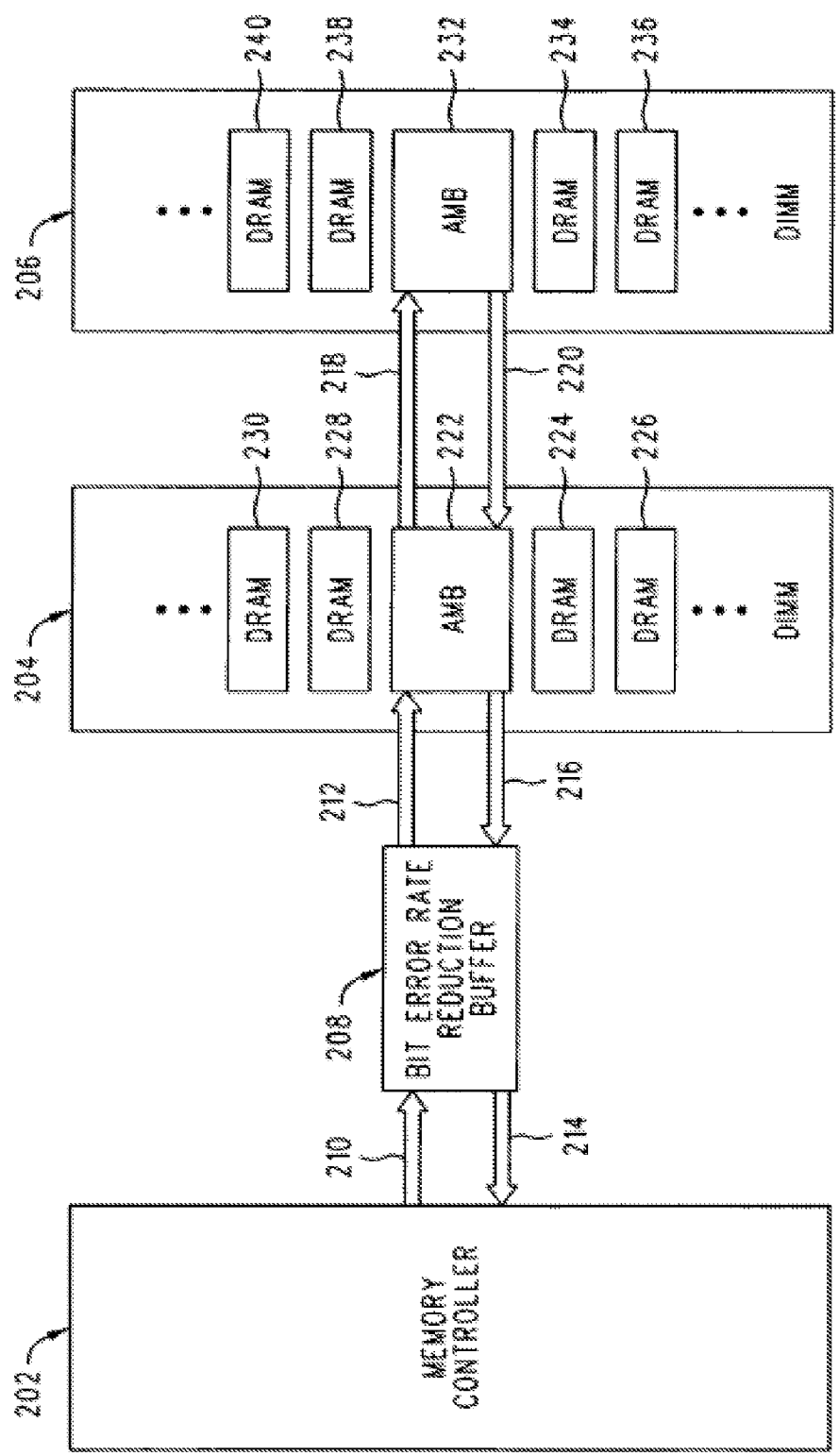
FIG. 2 is a block diagram of an embodiment of an electronic system for improving BER on HSS links.

FIG. 2 is a block diagram of an embodiment of a system for improving Bit Error Rate (BER) on HSS links. An HSS link may have any number of lanes (differential bit pairs). In this example, the HSS links 210, 212 and 218 pointing to the right have the same number of lanes. In this example, the HSS links 220, 216 and 214 pointing to the left have the same number of lanes. However, the HSS links 210, 212 and 218 that point to the right are not required to have the same number of lanes as the HSS links 220, 216 and 214 that point to the left. HSS link 210 is not required to have the same number of lanes as HSS links 212 and 218. HSS link 214 is not required to have the same number of lanes as HSS links 216 and 220.

In this embodiment, a memory controller 202 drives differential signals along HSS link 210, to a bit error rate reduction buffer 208. When the differential signals reach the bit error rate reduction buffer 208, the bit error rate reduction buffer 208, may retrieve the clock and data, may buffer the data, may check for errors, and may reduce skew between lanes. In addition, the bit error rate reduction buffer 208 may operate internally either in a serial or parallel mode. After data has been operated on by the bit error rate reduction buffer 208, it is resent serially along HSS link 212 to DIMM (Dual In-Line Memory Module) 204 and along HSS link 218 to DIMM 206.

DIMM 204 includes an AMB (advanced memory buffer) 222. The AMB 222 provides control and interface signals to the DRAMs (dynamic random access memory) 224, 226, 228; and 230, on the DIMM 204. DIMM 206 includes an AMB (advanced memory buffer) 232. The AMB 232 provides control and interface signals to the DRAMs (dynamic random access memory) 234, 236, 238, and 240, on the DIMM 206.

Data may also be driven from DIMM 206 through HSS link 220, through HSS link 216, to the bit error rate reduction buffer 208. In this block diagram, data is driven to the left. When the differential signals reach the bit error rate reduction buffer 208, the bit error rate reduction buffer 208, may retrieve the clock and data, may buffer the data, may check for errors, and may reduce skew between lanes. In addition, the bit error rate reduction buffer 208 may operate internally either in a serial or parallel mode. After data has been operated on by the bit error rate reduction buffer 208, it is resent serially along HSS link 214 to memory controller 202.

Data may also be driven from DIMM 204 through RSS link 216, to the bit error rate reduction buffer 208. In this block diagram, data is driven to the left. When the differential signals reach the bit error rate reduction buffer 208, the bit error rate reduction buffer 208, may retrieve the clock and data, may buffer the data, may check for errors, and may reduce skew between lanes. In addition, the bit error rate reduction buffer 208 may operate internally either in a serial or parallel mode. After data has been operated on by the bit error rate reduction buffer 208, it is resent serially along HSS link 214 to memory controller 202.

Figure 3:
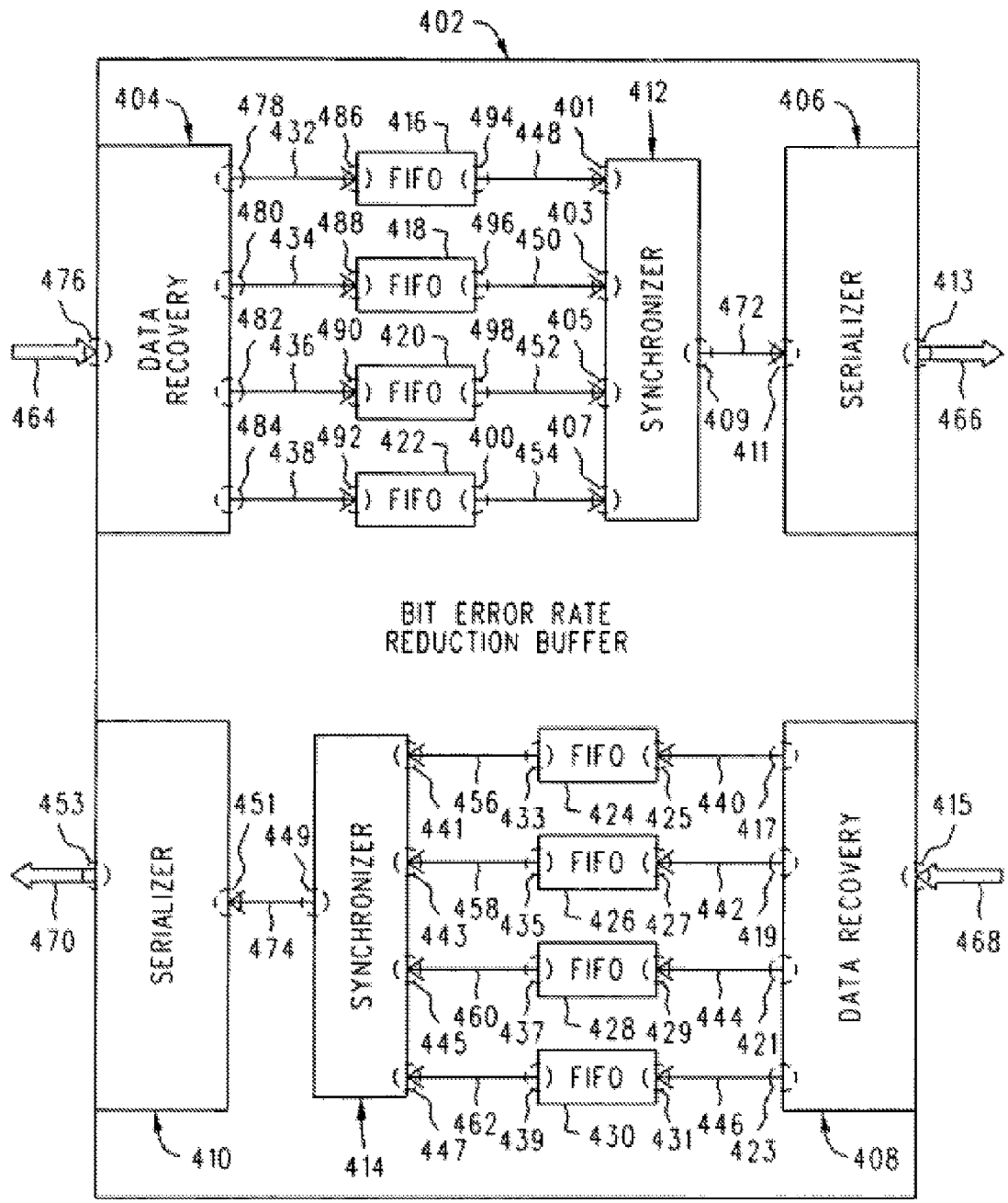
FIG. 3 is a block diagram of an embodiment of a bit error rate reduction buffer with skew reduction.

FIG. 3 is a block diagram of an embodiment of a bit error rate reduction buffer 402, with skew reduction. A HSS link 464 drives the differential bit pair inputs 476, of data recovery circuit 404. Data and clock are retrieved from the HSS link 464. A PLL (phase-locked loop) may be used as part of the data recovery circuit 404. The data recovery circuit 404, through differential bit pair outputs 478, 480, 482, and 484, drives lanes 432, 434, 436, and 438, respectively, into the differential bit pair inputs 486, 488, 490, and 492, of FIFOs (First In First Out stores) 416, 418, 420, and 422 respectively. Because data from FIFOs 416, 418, 420, and 422 is clocked out at nearly the same time, skew between lanes 448, 450, 452, and 454 may be reduced. Data from the outputs 494, 496, 498, and 400, of FIFOs 416, 418, 420, and 422 respectively is clocked in parallel through lanes 448, 450, 452, and 454 into inputs 401, 403, 405, and 407 of synchronizer 412. The parallel output 409, of synchronizer 412 then synchronizes the data from lanes 448, 450, 452, and 454. The parallel output 409, of synchronizer 412, is then driven into serializer 406 through bus 472. Serializer 406, through differential bit pair outputs 413, then drives HSS link 466.

A HSS link 468 drives the differential bit pair inputs 415, of data recovery circuit 408. Data and clock are retrieved from the HSS link 468. The data recovery circuit 408, through differential bit pair outputs 417, 419, 421, and 423, drives lanes 440, 442, 444, and 446, respectively, into the differential bit pair inputs 425, 427, 429, and 431, of FIFOs 424, 426, 428, and 430 respectively. A PLL may be used as part of the data recovery circuit 408. Because data from FIFOs 424, 426, 428, and 430 is clocked out at nearly the same time, skew between lanes 456, 458, 460, and 462 may be reduced. Data from the outputs 433, 435, 437, and 439, of FIFOs 424, 426, 428, and 430 respectively is clocked in parallel through lanes 456, 458, 460, and 462 into inputs 441, 443, 445, and 447 of synchronizer 414. The parallel output 449, of synchronizer 414 then synchronizes the data from lanes 456, 458, 460, and 462. The parallel out 449, of synchronizer 414, is then driven into serializer 410, through bus 474. Serializer 410, through differential bit pair outputs 453, then drives HSS link 470. In this example, the HSS links 464 and 466 pointing to the right have the same number of lanes. In this example, the HSS links 468 and 470 pointing to the left have the same number of lanes. However, the HSS links 464 and 466 that point to the right 464 and 466 are not required to have the same number of lanes as the HSS links 468 and 470 that point to the left. HSS link 464 is not required to have the same number of lanes as HSS link 466. HSS link 468 is not required to have the same number of lanes as HSS link 470. Differential signals are not required for signals internal to the bit error rate reduction buffer 402.

Figure 4:
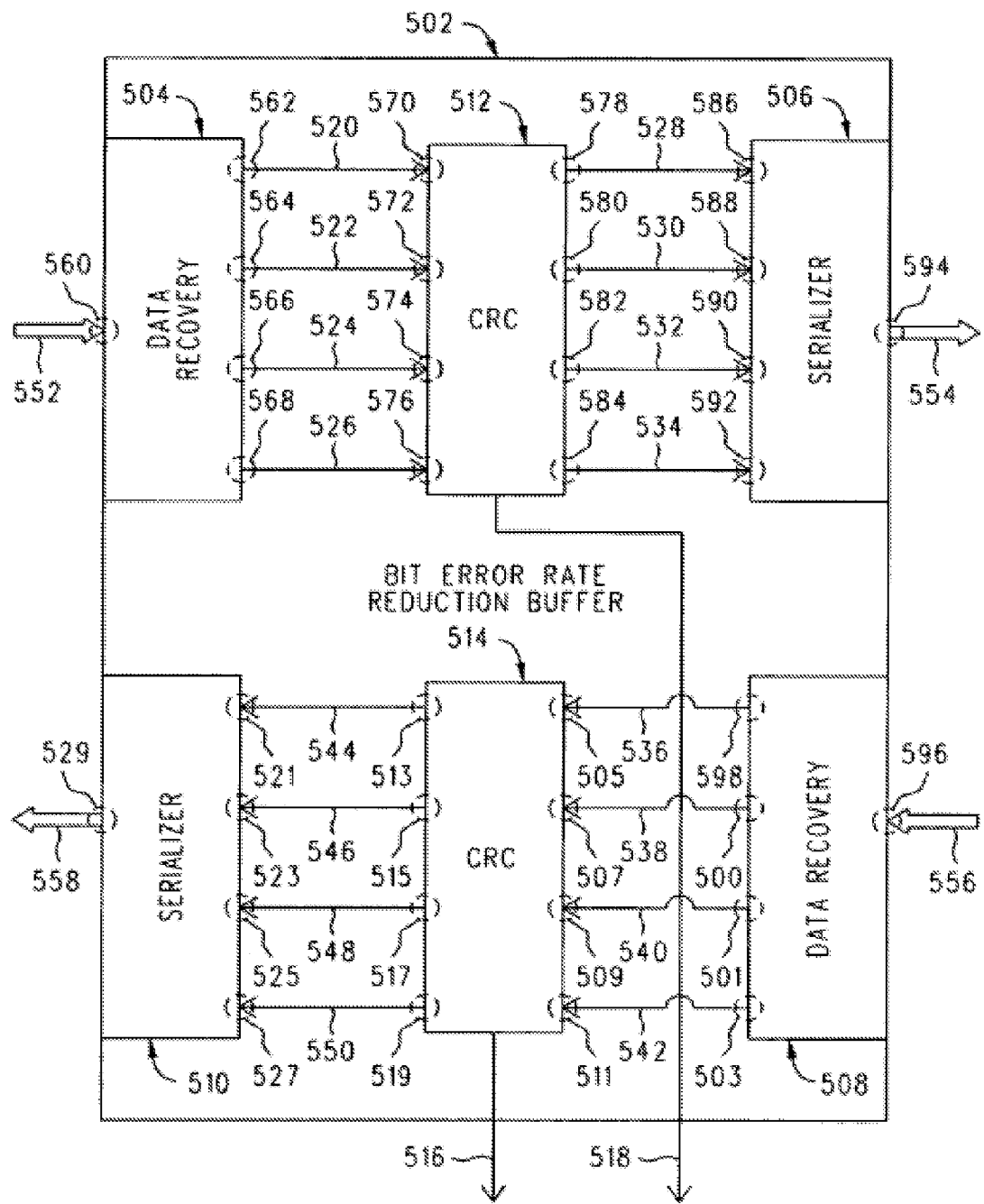
FIG. 4 is a block diagram of an embodiment of a bit error rate reduction buffer with fault-isolation.

FIG. 4 is a block diagram of an embodiment of a bit error rate reduction buffer 502, with fault-isolation. A HSS link 552 drives the differential bit pair inputs 560, of the data recovery circuit 504. A PLL may be used as part of the data recovery circuit 504. Data and clock are retrieved from the HSS link 552. The differential bit pair outputs 562, 564, 566, and 568 of the data recovery circuit 504, drive lanes 520, 522, 524, and 526, into the differential bit pair inputs 570 572, 574, and 576 of CRC (cyclic redundancy check) circuit 512. If an error is detected, the fault-isolation indicator 518 sends a signal that indicates an error may have occurred in lane 520, 522, 524, or 526. CRC circuit 512, through differential bit pair outputs 578, 580, 582, and 584, drives the differential bit pair inputs 586, 588, 590, and 592, of serializer 506, through lanes 528, 530, 532, and 534 respectively. Serializer 506, then sends the data through differential bit pair output 594 to HSS link 554.

A HSS link 556 drives the differential bit pair inputs 596, of the data recovery circuit 508. Data and clock are retrieved from the HSS link 556. A PLL may be used as part of the data recovery circuit 508. The differential bit pair outputs 598, 500, 501, and 503 of the data recovery circuit 508, drive lanes 536, 538, 540, and 542, into the differential bit pair inputs 505, 507, 509, and 511 of CRC (cyclic redundancy check) circuit 514. If an error is detected, the fault-isolation indicator 516 sends a signal that indicates an error may have occurred in lane 536, 538, 540, or 542. CRC circuit 514, through differential bit pair outputs 513, 515, 517, and 519, drives the differential bit pair inputs 521, 523, 525, and 527, of serializer 510 through lanes 544, 546, 548, and 550 respectively. Serializer 510 then sends the data through differential bit pair output 529 to HSS link 558. In this example, the HSS links 552 and 554 pointing to the right have the same number of lanes. In this example, the HSS links 556 and 558 pointing to the left have the same number of lanes. However, the HSS links 552 and 554 that point to the right are not required to have the same number of lanes as the HSS links 556 and 558 that point to the left. HSS link 552 is not required to have the same number of lanes as HSS link 554. HSS link 556 is not required to have the same number of lanes as HSS link 558. Differential signals are not required for signals internal to the bit error rate reduction buffer 502.

Figure 5:
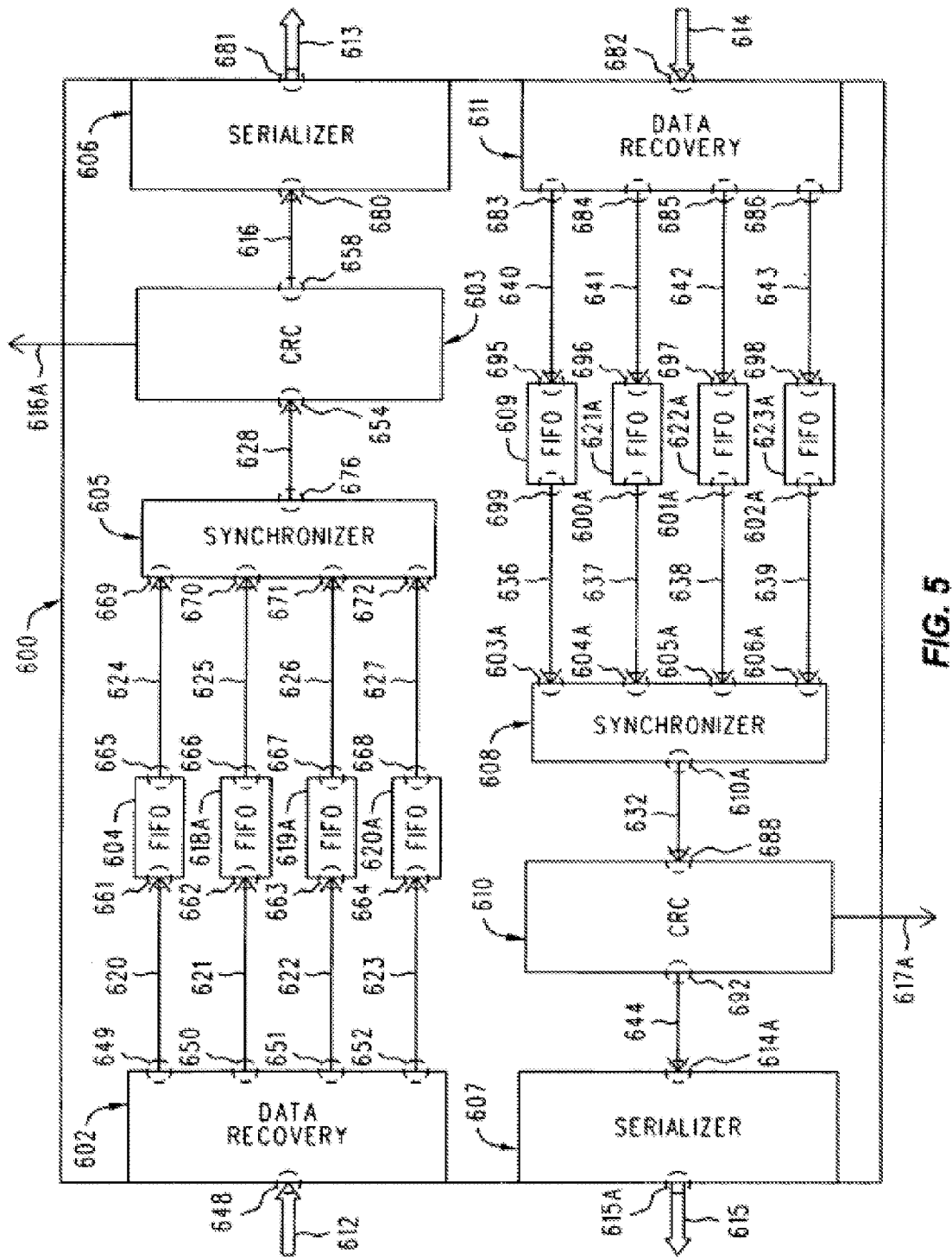
FIG. 5 is a block diagram of an embodiment of a bit error rate reduction buffer with fault-isolation and skew reduction.

FIG. 5 is a block diagram of an embodiment of a bit error reduction buffer, 600, with skew reduction and fault isolation. A HSS link, 612, drives the differential bit pair inputs, 648, of the data recovery circuit, 602. A PLL may be used as part of the data recovery circuit, 602. Data and clock are retrieved from the HSS link, 612. The differential bit pair outputs, 649, 650, 651, and 652 of the data recovery circuit, 602, drive lanes, 620, 621, 622, and 623, into the differential bit pair inputs, 661, 662, 663, and 664 of FIFOs, 604, 618A, 619A, and 620A, respectively. Because data from FIFOs 604, 618A, 619A, and 620A, is clocked out at nearly the same time, skew between lanes 624, 625, 626, and 627 may be reduced. Data from the outputs, 665, 666, 667, and 668, of FIFOs, 604, 618A, 619A, and 620A respectively is clocked in parallel through lanes, 624, 625, 626, and 627 into inputs, 669, 670, 671, and 672 of synchronizer 605. The parallel output, 676, of synchronizer 605 then synchronizes the data from lanes 624, 625, 626, and 627. The parallel output, 676, of synchronizer, 605, is then driven into the parallel input, 654, of CRC circuit, 603, though bus 628. If an error is detected, the fault-isolation indicator, 616A, sends a signal that indicates an error may have occurred in lane 624, 625, 626, or 627. CRC circuit, 603, through parallel output, 658, drives parallel input, 680, of serializer, 606, through bus 616. Serializer, 606, through differential bit pair outputs, 681, then drives HSS link 613.

A HSS link, 614, drives the differential bit pair inputs, 682, of the data recovery circuit, 611. A PLL may be used as part of the data recovery circuit, 611. Data and clock are retrieved from the HSS link, 614. The differential bit pair outputs, 683, 684, 685, and 686 of the data recovery circuit, 611, drive lanes, 640, 641, 642, and 643, into the differential bit pair inputs, 695, 696, 697, and 698 of FIFOs, 609, 621A, 622A, and 623A, respectively. Because data from FIFOs 609, 621A, 622A, and 623A, is clocked out at nearly the same time, skew between lanes 636, 637, 638, and 639 may be reduced. Data from the outputs, 699, 600A, 601A, and 602A, of FIFOs, 609, 621A, 622A, and 623A respectively is clocked in parallel through lanes, 636, 637, 638, and 639 into inputs, 603A, 604A, 605A, and 606A of synchronizer 608. The parallel output, 610A, of synchronizer 608 then synchronizes the data from lanes 636, 637, 638, and 639. The parallel output, 610A, of synchronizer, 608, is then driven into the parallel input, 688, of CRC circuit, 610, though bus 632. If an error is detected, the fault-isolation indicator, 617A, sends a signal that indicates an error may have occurred in lane 636, 637, 638, or 639. CRC circuit, 610, through parallel output, 692, drives parallel input, 614A, of serializer, 607, through bus 644. Serializer 607, through differential bit pair outputs 615A, then drives HSS link 615. In this example, the HSS links 614 and 615 pointing to the left have the same number of lanes. However, the HSS links 612 and 613 that point to the right are not required to have the same number of lanes as the HSS links 614 and 615 that point to the left. HSS link 612 is not required to have the same number of lanes as HSS link 613. HSS link 614 is not required to have the same number of lanes as HSS link 615. Differential signals are not required for signals internal to the bit error rate reduction buffer, 600.

When the BER of an HSS link such as the HSS link 108 (FIG. 1) fails to meet a required specification, a bit error rate reduction buffer 208 (FIG. 2) may be used to reduce the BER and meet the required specification. One way this may be accomplished is by physically dividing the HSS link 108 into two separate HSS links 210 and 212, each link 210, 212 being about half the length of the original HSS link 108, and then physically and electrically connecting bit error rate reduction buffer 208 between the two divided HSS links 210 and 212. Because each of the links 210 and 212 is about half the length of the HSS link 108, the HSS link 210 will have substantially the same length as the HSS link 212. The bit error rate reduction buffer 208 improves the BER by recovering data at a point with a higher signal-to-noise ratio. In addition, the bit error rate reduction buffer 208 may indicate when an error occurs through a fault-isolation indicator.

The foregoing description has been presented for purposes of illustration and description. It is not intended to be exhaustive or to limit the invention to the precise form disclosed, and other modifications and variations may be possible in light of the above teachings. The exemplary embodiments were chosen and described in order to best explain the applicable principles and their practical application to thereby enable others skilled in the art to best utilize various embodiments and various modifications as are suited to the particular use contemplated. It is intended that the appended claims be construed to include other alternative embodiments except insofar as limited by the prior art.

What is claimed is:

1. A bit error rate reduction buffer comprising:
    a data recovery circuit including differential bit pair inputs and differential bit pair outputs;
    a cyclic redundancy check (CRC) circuit including differential bit pair inputs, differential bit pair outputs and a fault-isolation indicator; and
    a serializer including differential bit pair inputs and differential bit pair outputs;
    the differential bit pair outputs of the data recovery circuit being coupled to the differential bit pair inputs of the CRC circuit; and
    the differential bit pair outputs of the CRC circuit being coupled to the differential bit pair inputs of the serializer;
    the differential bit pair inputs of the data recovery circuit to be driven by a first high speed serial (HSS) link;
    the different bit pair outputs of the serializer to drive a second HSS link; and
    the fault-isolation indicator of the CRC circuit to indicate a fault when a fault is detected by the CRC circuit.

2. The bit error rate reduction buffer as defined in claim 1, wherein the data recovery circuit further includes a phase-locked loop.

3. A bit error rate reduction method, comprising:
    transmitting differential signals along a first high speed serial link to a bit error rate reduction buffer, the bit error rate reduction buffer including:
        a data recovery circuit including differential bit pair inputs and differential bit pair outputs;
        a cyclic redundancy check (CRC) circuit including differential bit pair inputs, differential bit pair outputs and a fault-isolation indicator; and
        a serializer including differential bit pair inputs and differential bit pair outputs;
        the differential bit pair outputs of the data recovery circuit being coupled to the differential bit pair inputs of the CRC circuit;
        the differential bit pair outputs of the CRC circuit being coupled to the differential bit pair inputs of the serializer;
        the differential bit pair inputs of the data recovery circuit are to be driven by the first high speed serial link;
        the different bit pair outputs of the serializer to drive a second high speed serial link; and
        the fault-isolation indicator of the CRC circuit to indicate a fault when a fault is detected by the CRC circuit; and
    after the differential signals have been operated on by the bit error rate reduction buffer, resending the differential signals along the second high speed serial link.

4. The bit error rate reduction method as defined in claim 3, wherein the data recovery circuit comprises a phase-locked loop.

5. The bit error rate reduction method as defined in claim 3, wherein the bit error rate reduction buffer, the first high speed serial link and the second high speed serial link couple a memory controller to a memory block.

* * * * *